US006980956B1

(12) United States Patent
Takagi et al.

(10) Patent No.: US 6,980,956 B1
(45) Date of Patent: Dec. 27, 2005

(54) MACHINE APPARATUS AND ITS DRIVING METHOD, AND RECORDED MEDIUM

(75) Inventors: Tsuyoshi Takagi, Chiba (JP); Masanori Omote, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/623,440

(22) PCT Filed: Jan. 7, 2000

(86) PCT No.: PCT/JP00/00041

§ 371 (c)(1),
(2), (4) Date: Sep. 5, 2000

(87) PCT Pub. No.: WO00/40377

PCT Pub. Date: Jul. 13, 2000

(30) Foreign Application Priority Data

Jan. 7, 1999 (JP) ................................. 11-002150
Nov. 30, 1999 (JP) ................................. 11-340467

(51) Int. Cl.[7] ........................ G10L 21/00; G10L 15/12; G05B 19/045
(52) U.S. Cl. .................... 704/275; 704/272; 704/240; 700/250; 700/257
(58) Field of Search ............................... 704/275, 272, 704/231, 209, 207, 270, 240, 255, 277, 256, 704/251, 10; 700/248, 243, 245, 250, 257; 318/568.12

(56) References Cited

U.S. PATENT DOCUMENTS 5,175,798 A * 12/1992 Taylor et al. ................ 706/43

5,870,527 A      2/1999   Fujikawa et al.
5,966,690 A *   10/1999   Fujita et al. ................. 704/233
6,160,986 A *   12/2000   Gabai et al. ................. 434/308
6,175,772 B1 *   1/2001   Kamiya et al. ............... 700/31
6,646,541 B1 * 11/2003   Wang et al. ................. 700/258

FOREIGN PATENT DOCUMENTS

| EP | 0 762 498 A2 | 3/1997 |
| JP | 62-24988 | 2/1987 |
| JP | 9-114514 | 5/1997 |
| JP | 9-212192 | 8/1997 |
| JP | 10-260692 | 9/1998 |
| JP | 10-289006 | 10/1998 |

OTHER PUBLICATIONS

"Adaptive LEGO robots. A robot=human view on robotics"; Lund, H.H.; Bjerre, C.; Nielsen, J.H.; Nielsen, M.; Stoy, K.; 1999. IEEE SMC '99 Conference Proceedings. vol.: 2, Oct. 12-15, 1999, pp. 1017-1023 vol. 2.*
"Subjective Interpretation of Emotional Behavior through Physical Interaction between Human and Robot", Shibata, T.; Tashim T.; Tanie, K.; 1999. IEEE SMC '99 Conference Proceedings. vol.: 2, Oct. 12-15, 1999, pp. 1024-1029 vol. 2.*

(Continued)

Primary Examiner—W. R. Young
Assistant Examiner—James S. Wozniak
(74) Attorney, Agent, or Firm—Frommer Lawrence & Haug LLP; William S. Frommer; Darren M. Simon (57) ABSTRACT

Drive means for performing a behavior based on a behavioral model prescribing a behavior is controlled, and the behavioral model is changed depending on a predetermined stimulus. Therefore, by giving the stimulus, the behavioral model can be freely changed, and a mechanical device, etc. having an improved amusing element can be realized.

11 Claims, 9 Drawing Sheets

OTHER PUBLICATIONS

"Recognizing Human Touching Behaviors using a Haptic Interface for a Pet-robot", Naya, F.; Yamato, J.; Shinozawa, K.; IEEE SMC '99 Conference Proceedings. vol.: 2, Oct. 12-15, 1999, pp.: 1030-1034 vol. 2.*

Mitchell, R.J., Keating, D.A. & Kambhampati, C. (1994) "Neural network controller for mobilerobot insect." Proc. EURISCON '94.*

Toshihiro Tajima, et al., "Interactive Pet Robot having emotion" (in Japanese), Extended Abstracts (The 16th meeting, 1998); Japan Robot Society, Sep. 18, 1998, vol. 1, pp. 11-12.

Hirohide Ushida, et al., "Emotional Model Application to Pet Robot" (in Japanese), proceedings distributed at Lecture Meeting on Robotics, Mechatronics prepared by Japan Machinery Society, Jun. 26, 1998, vol. 1998, No. Ptl, p 2 CII4.5(1)-2CII4.5(2).

Masahiro Fujita, et al., "ROBOT Entertainment", Proceedings of the 6th Sony Research Forum, Nov. 27, 1996, p. 234-239.

Masahiro Fujita, et al., "Reconfigurable Physical Agents", Proceedings of the Second International Conference on Autonomous Agents, May 9, 1998, p. 54-61.

* cited by examiner

| WORD | PROSODY INFORMATION | EVALUATION | CHANGE RATE |
|---|---|---|---|
| GOOD! | yoshiyoshi | 「PRAISE」 | $L_{yoshiyoshi}$ |
| GOOD BOY(GIRL)! | iiko | 「PRAISE」 | $L_{iiko}$ |
| HEY! | kora | 「ANGER」 | $L_{kora}$ |
| STOP IT! | yame | 「ANGER」 | $L_{yame}$ |
| NO! | dame | 「ANGER」 | $L_{dame}$ |
| ⋮ | ⋮ | ⋮ | ⋮ |

MACHINE APPARATUS AND ITS DRIVING METHOD, AND RECORDED MEDIUM

TECHNICAL FIELD

The present invention relates to a mechanical device, a method for driving the mechanical device, and a recording medium. Actually, it relates to a mechanical device capable of providing a robot, etc. for changing behaviors depending on, for example, the liking of each user, a method for driving the mechanical device, and a recording medium.

BACKGROUND ART

Conventionally, a number of robots (including stuffed animals) have been developed such that they start acting when a touch switch is pressed or when they detect voice at a level equal to or higher than a predetermined level, and have been put on the market as toys, etc.

However, with the conventional robots, the relationship of the behaviors of the robots with a touch-switch pressing operation and a voice input is fixed, and the user cannot change the behaviors of the robots according to the liking of the user. Therefore, the robots only repeat several limited behaviors, thereby boring most of the users.

DISCLOSURE OF THE INVENTION

The present invention has been developed based on the above described background, and aims at providing a robot, etc. capable of outstandingly improving amusing elements.

To solve the above described problems with the conventional robots, the mechanical device according to the present invention includes stimulus detection means for detecting a stimulus, control means for controlling drive means for performing a behavior based on a behavioral model prescribing a behavior; and changing means for changing a behavioral model based on a predetermined stimulus detected by the stimulus detection means.

A stimulus can be provided by a user.

The stimulus detection means is provided with a pressure sensor for detecting the pressure provided by a user as a stimulus. The changing means can change a behavioral model based on the pressure detected by the pressure sensor.

The stimulus detection means is provided with a a pressure sensor for detecting the pressure provided by a user as a stimulus. The changing means can change a behavioral model based on the level or the length of the pressure detected by the pressure sensor.

The stimulus detection means is provided with a microphone for collecting voice from a user as a stimulus. The changing means can change a behavioral model based on the voice collected by the microphone.

The stimulus detection means can be further provided with a speech recognition means for recognizing speech. The changing means can change a behavioral model based on a speech recognition result of the speech obtained by the speech recognition means.

The speech recognition means can be provided with a dictionary storing a word to be processed in a speech recognizing process corresponding to a method for changing a behavioral model so that any of the words stored in the dictionary can be output as a speech recognition result. In this case, the changing means can change a behavioral model in the changing method corresponding to the word output as the speech recognition result.

The stimulus detection means further comprises a prosody information detection means for detecting prosody information about voice. The changing means can change a behavioral model according to the prosody information detected by the prosody information detection means.

A behavioral model can be defined as an automaton prescribed by a node corresponding to a state and an arc corresponding to an action. An arc is assigned a weight coefficient. An arc corresponding to an action is selected by a weight coefficient, and an action, that is, a predetermined behavior, is performed. In addition, a weight coefficient can be probability (hereinafter referred to as transition probability). In this case, it is referred to as a probability automaton according to which a behavior (action) is generated based on the probability. The changing means can change a weight coefficient (transition probability) based on a stimulus detected by the stimulus detection means. Furthermore, a behavioral model can be not only a model configured by an automaton, but also a model configured by an algorithm such as a neural network, the If-Then rule, etc.

After changing a behavioral model, the changing means can also restore the behavioral model to its original state corresponding to the lapse of time.

The method for driving the mechanical device according to the present invention includes a controlling step of controlling the drive means for allowing the mechanical device to perform a behavior based on a behavioral model prescribing a behavior, a stimulus detecting step of detecting a stimulus, and a changing step of changing a behavioral model in response to a predetermined stimulus detected in the stimulus detecting step.

Furthermore, the recording medium according to the present invention stores a program including a controlling step of controlling the drive means for allowing the mechanical device to perform a behavior based on a behavioral model prescribing a behavior, a stimulus detecting step of detecting a stimulus, and a changing step of changing a behavioral model in response to a predetermined stimulus detected in the stimulus detecting step.

As described above, according to the mechanical device, the method for driving the mechanical device, and the recording medium thereof of the present invention, the drive means for performing a behavior is controlled based on a behavioral model prescribing a behavior, a stimulus is detected, and a behavioral model is changed based on the stimulus. Therefore, a behavioral model can be freely changed by providing a predetermined stimulus. As a result, a robot, etc. can be provided with its amusing element much more improved.

BEST MODE FOR CARRYING OUT THE INVENTION

Figure 1:
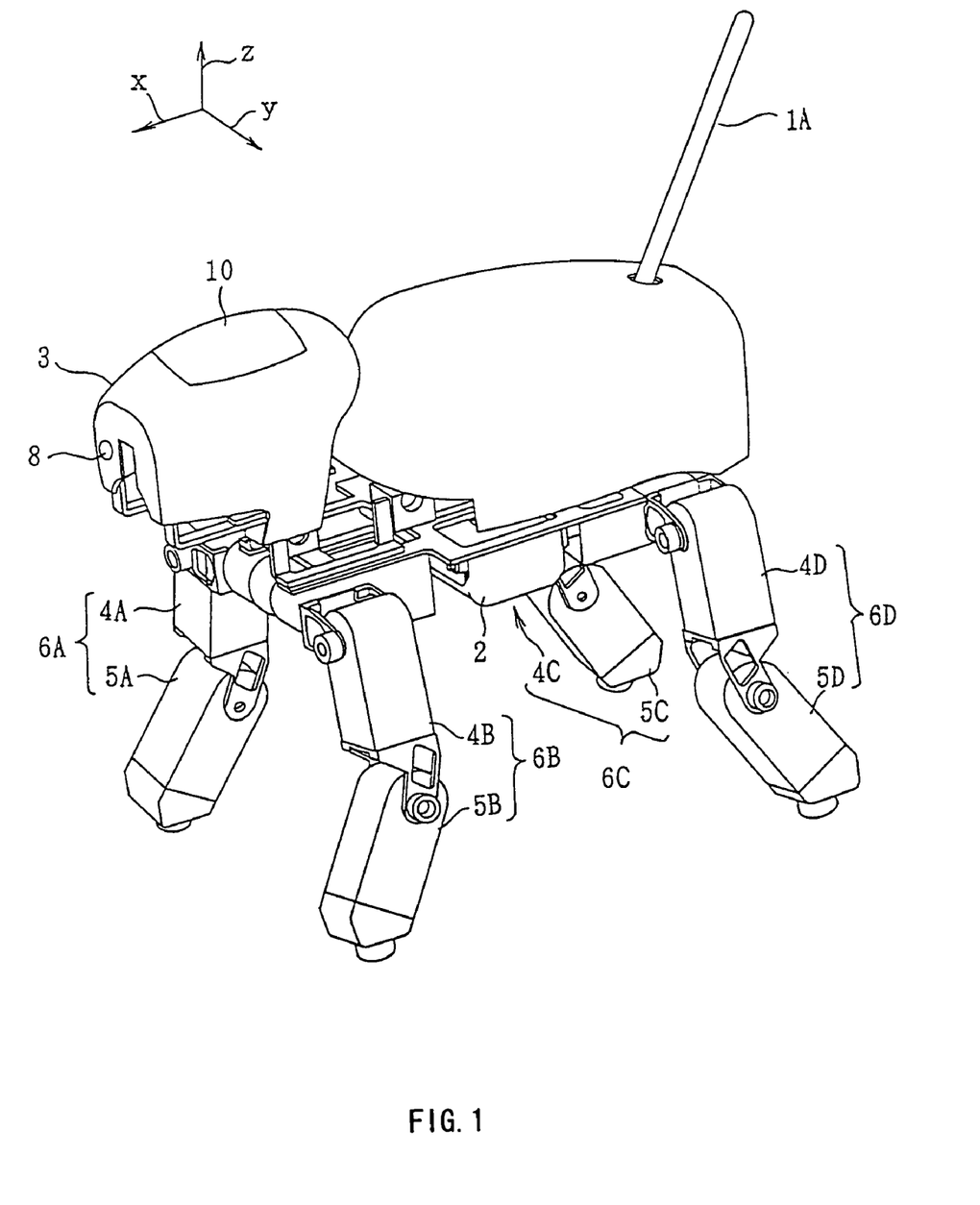
FIG. 1 is an oblique view of an example of an appearance of an embodiment of a robot 1 to which the present invention is applied.
Figure 2:
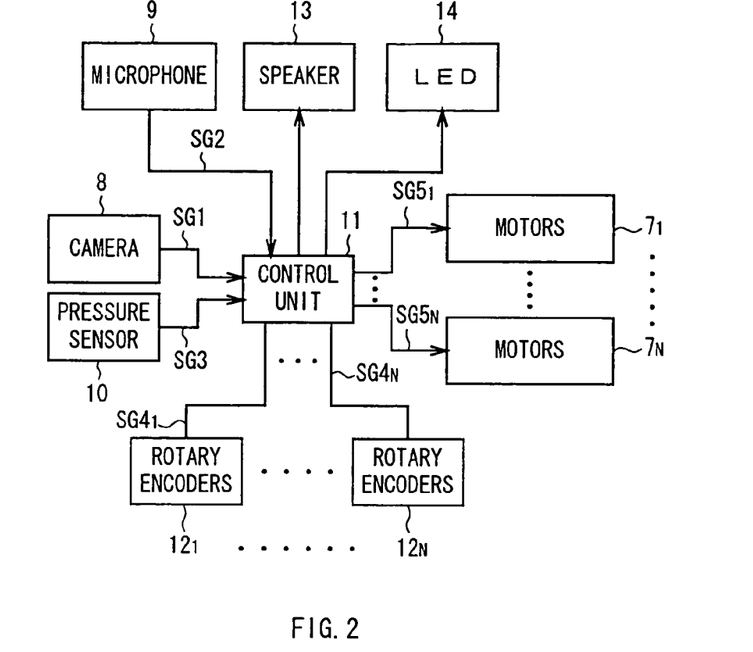
FIG. 2 is a block diagram of an internal configuration of the robot 1.

FIG. 1 shows an example of an appearance of an embodiment of a robot 1 to which the present invention is applied, and FIG. 2 shows an example of an electrical configuration.

According to the present embodiment, the robot 1 takes the form of a dog. A head unit 3 is attached to the front end of a belly unit 2, and leg units 6A to 6D that comprise upper leg units 4A to 4D and lower leg units 5A to 5D are respectively attached to the right front, left front, right rear, and left rear portions of the belly unit 2. Furthermore, a tail unit 1A is attached to the rear end of the belly unit 2.

Each of the joint mechanisms connecting the tail unit 1A with the belly unit 2, the head unit 3 with the belly unit 2, each of the upper leg units 4A to 4D with the belly unit 2, and the upper leg units 4A to 4D respectively with the lower leg units 5A to 5D is provided with motors $7_1, 7_2, \ldots$ to $7_N$ as actuators for driving corresponding motors $7_1$ to $7_N$, thereby freely rotating the tail unit 1A and the head unit 3 on the three axes, that is, the x, y, and z axes, freely rotating the upper leg units 4A to 4D on the two axes, that is, the x and y axes, and rotating the lower leg units 5A to 5D only on the x axis. Thus, the robot 1 can perform various behaviors.

The head unit 3 is provided with a camera 8, a microphone 9, a pressure sensor 10, a speaker 13, and LEDs (light emitting diodes) 14 as eyes in respective positions. A control unit 11 is mounted in the belly unit 2. The camera 8 captures images of the surrounding objects including the user, and the microphone 9 collects surrounding voice including the user's voice. The pressure sensor 10 detects the pressure from the user, etc. The images of the surrounding objects captured by the camera 8, the surrounding voice collected by the microphone 9, and the pressure supplied to the head by the user and detected by the pressure sensor 10 are provided for the control unit 11 as an image signal SG1, a voice signal SG2, and a pressure detection signal SG3, respectively.

The motors $7_1$ to $7_N$ corresponding to the respective joint mechanisms are provided with the respective rotary encoders $12_1$ to $12_N$. The rotary encoders $12_1$ to 12N detect the roration angles of the rotating spindles of the corresponding motors $7_1$ to $7_N$.

The rotation angles detected by the rotary encoders $12_1$ to $12_N$ are supplied to the control unit 11 respectively as angle detection signals $SG4_1$ to $SG4_N$.

The control unit 11 determines the surrounding situation, its own posture, etc. according to an image signal SG1, a voice signal SG2, a pressure detection signal SG3, and the angle detection signals $SG4_1$ to $SG4_N$, determines the behavior to be performed according to a preliminarily input control program, and drives necessary motors $7_1$ to $7_N$ based on the determination results.

Thus, the robot 1 moves the tail unit 1A, the head unit 2, the leg units 6A to 6D to enter a desired state and autonomously performs behaviors.

Figure 3:
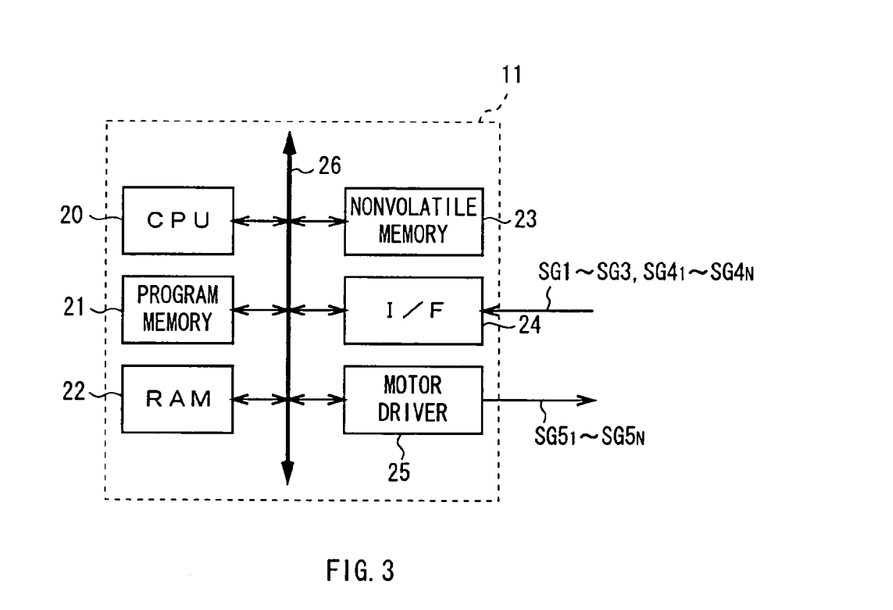
FIG. 3 is a block diagram of a configuration of a control unit 11.

FIG. 3 shows an example of the configuration of the control unit 11 shown in FIG. 2.

FIG. 11 is configured by a CPU (central processing unit) 20, program memory 21 configured by EEPROM (electrically erasable programmable read-only memory), etc., RAM (random access memory) 22, as the work memory of the CPU 20, nonvolatile memory 23 storing data of spectrum waveforms of various types of voice, etc., an interface circuit (I/F) 24 for receiving various signals, and a motor driver 25 for drive-controlling each of the motors $7_1$ to $7_N$ connected through a bus 26.

Figure 4:
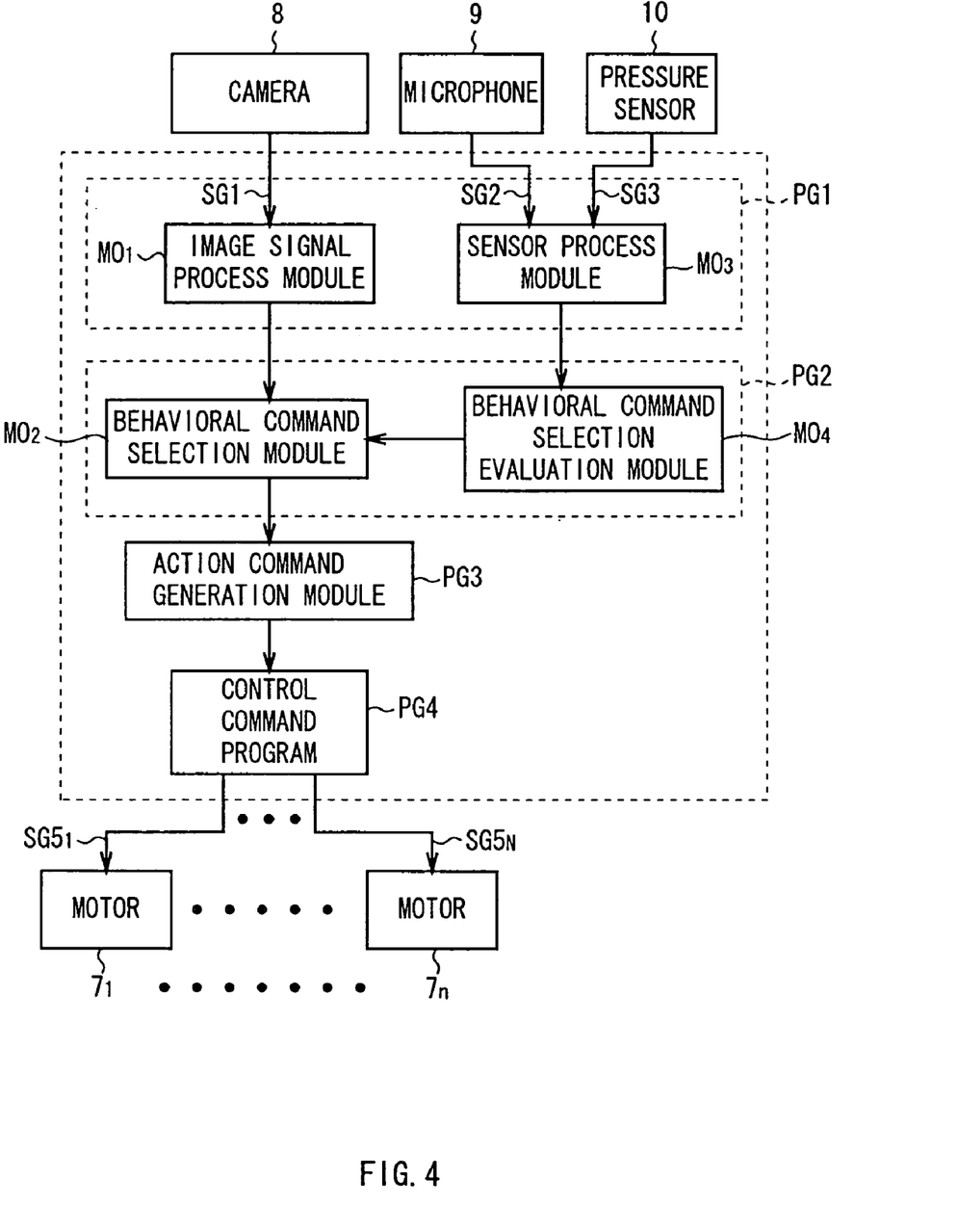
FIG. 4 shows a control program executed by a CPU 20.

The program memory 21 stores as control programs a sensor process program PG1, a behavior command generation program PG2, an action command generation module PG3, and a control command program PG4 as shown in FIG. 4. The sensor process program PG1 is configured by an image signal process module $MO_1$ and a sensor process module $MO_3$. The behavior command generation program PG2 is configured by a behavioral command selection module $MO_2$ and a behavioral command selection evaluation module $MO_4$.

When the CPU 20 executes the control programs PG1 to PG4 in a time division manner, the motors $7_1$ to $7_N$ are driven, and the robot 1 performs various behaviors.

That is, the CPU 20 fetches the image signal SG1 provided from the camera 8 to the RAM 22 according to the sensor process program PG1 through the interface circuit 24 and the bus 26.

When, a predetermined object, for example, a red and sphere object (ball), is detected according to the fetched image signal SG1 and the image signal process program module $MO_1$ of the sensor process program PG1, the CPU 20 generates image process information about the detection.

Then, the CPU 20 generates a command to perform a behavior such as "sleeping", "sitting down", "standing up", etc. based on the image process information and the behavioral command selection program module $MO_2$ of the behavioral command generation program PG2.

Figure 5:
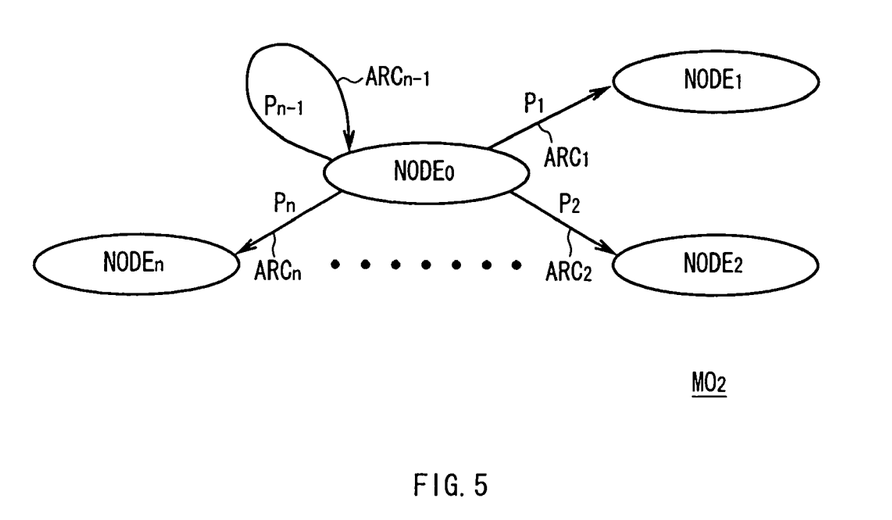
FIG. 5 shows a probability automaton as a behavioral model.

The behavioral command selection program module $MO_2$ can be represented as, for example, a probability automaton as a behavioral model prescribing a behavior of the robot 1 as shown in FIG. 5. In a probability automaton, a state is represented by nodes $NODE_0$ to $NODE_M$, and the transition of a behavior is represented by an arc $ARC_{m1}$ (m0, m1=0, 1, ..., M) indicating the transition from the node $NODE_{m0}$ corresponding to a state to the node $NODE_{m1}$ corresponding to another state (which can be the same behavior).

In the arc $ARC_{m1}$ indicating the transition from a node $NODE_{m0}$ to another node $NODE_{m1}$, the transition probability $P_{m1}$ generated by the transition is set, and the transition of a node, that is, a change in the state, is determined based on the transition probability.

In FIG. 5, to avoid a complicated drawing, only the arcs $ARC_0$ to $ARC_M$ from the node $NODE_0$ to other nodes (including itself) $NODE_0$ to $NODE_M$ are shown relating to the probability automaton comprising M+1 nodes.

The CPU 20 determines according to the above described behavioral command selection program module $MO_2$ and the image process information based on the probability as to what behavior is to be performed afterwards, and generates a command to perform a behavior corresponding to the determined behavior.

Furthermore, according to the thus generated behavior command and the action command generation module PG3, the CPU 20 generates a practical behavior plan to perform a behavior corresponding to the behavior command generated according to the behavioral command selection module MO$_2$ of the behavioral command generation program PG2. The behavior plan is a plan to drive each of the motors $7_1$ to $7_N$ to perform the specified behavior.

Then, the CPU 20 computes the rotation angle for each of the motors $7_1$ to $7_N$ to practically drive and rotate each of the motors $7_1$ to $7_N$ based on an analysis result obtained by analyzing by the sensor process program PG1 the angle detection signals SG4$_1$ to SG4N according to the behavior plan, the control command generation program PG4, and the rotary encoders 12$_1$ to 12$_N$.

Then, the CPU 20 rotates the motors $7_1$ to $7_N$ by a desired degrees by transmitting drive signals SG5$_1$ to SG5$_N$ based on the computation result respectively to corresponding motors $7_1$ to $7_N$. Thus, the robot 1 can perform a behavior generated by the behavioral command generation program PG2.

As described above, the CPU 20 instructs the robot 1 to perform various behaviors by controlling each of the motors $7_1$ to $7_N$ according to the image signal SG1 output from the camera 8, and the control programs PG1 to PG4 stored in the program memory 21.

Furthermore, according to the present embodiment, the evaluation of a user for the behavior of the robot 1 is recognized according to the voice signal SG2 output from the microphone 9 and the pressure detection signal SG3 output from the pressure sensor 10. Based on the recognition result of the evaluation, a behavior selection pattern can be changed.

That is, the CPU 20 of the control unit 11 fetches the voice signal SG2 from the microphone 9 and the pressure detection signal SG3 from the pressure sensor to the RAM 22 sequentially through the interface circuit 24 and the bus 26 according to the sensor process program module MO$_3$ of the sensor process program PG1.

Then, the CPU 20 converts the voice signal SG2 fetched according to the sensor process program module MO$_3$ of the sensor process program PG1 into a spectrum waveform of voice, and compares the spectrum waveform with each of the spectrum waveforms of various words used when people praise or scold their pets such as "Stop!", "Good!", "Hey!", Furthermore, when the spectrum waveform of the voice signal SG2 substantially matches based on the comparison result the spectrum waveform of a word which is used when people praise their pets, and is registered in the nonvolatile memory 23, the CPU 20 determines that the user has praised the robot 1. When the spectrum waveform of the voice signal SG2 substantially matches based on the comparison result the spectrum waveform of a word which is used when people scold their pets, and is registered in the nonvolatile memory 23, the CPU 20 determines that the user has scolded the robot 1.

When the evaluation is, for example, "praise" according to the evaluation of the user and the behavioral command selection evaluation program module MO$_4$ of the behavioral command generation program PG2, the CPU 20 computes a new transition probability obtained by raising, by a predetermined rate (for example, 10%), the transition probability P$_m$ from the behavior (hereinafter referred to as a preceding behavior) preceding in the probability automaton (that is, the behavioral command selection program module MO$_2$) shown in FIG. 5 to the behavior (hereinafter referred to as a transition behavior) to be transferred to or to which transfer has already been performed, and a new transition probability to each behavior when the transition probability (the transition probability excluding P$_m$ from the transition probability P$_0$ to P$_M$) from the preceding behavior to another behavior is lowered by the same rate, and changes, based on the computation results, each of the transition probability P$_0$ to P$_M$ of the probability automaton in the behavioral command selection program module MO$_2$ respectively into the newly computed values.

When the evaluation is, for example, "scolding" according to the evaluation of the user and the behavioral command selection evaluation program module MO$_4$ of the behavioral command generation program PG2, the CPU 20 computes a new transition probability obtained by lowering, by a predetermined rate (for example, 10%), the transition probability P$_m$ from the preceding behavior to the transition behavior, and a new transition probability to each behavior when the transition probability from the preceding behavior to another behavior is raised by the same rate, and changes, based on the computation results, each of the transition probability P$_0$ to P$_M$ of the probability automaton in the behavioral command selection program module MO$_2$ respectively into the newly computed values.

Similarly, the CPU 20 determines that the robot has been stroked (praised) by the user when, for example, low pressure is detected for a predetermined time length according to the pressure detection signal SG3 from the pressure sensor 10 and the sensor process program module MO$_3$ of the sensor process program PG1, and determines that the robot has been flapped (scolded) by the user when high pressure is detected for a short time.

When the evaluation refers to "praise" according to the evaluation of the user who has made determination as described above, and the behavioral command selection evaluation program module MO$_4$ of the behavioral command generation program PG2, the CPU 20 raises the transition probability P$_m$ from a preceding behavior to a transition behavior in the behavioral command selection program module MO$_2$ by a predetermined rate (for example, 10%) as in the above described case, and lowers the transition probability from the preceding behavior to another behavior by the same rate.

When the evaluation refers to "scolding", the CPU 20 lowers the transition probability P$_m$ from a preceding behavior to a transition behavior in the behavioral command selection program module MO$_2$ by a predetermined rate (for example, 10%), and raises the transition probability from the preceding behavior to another behavior by the same rate.

Thus, according to the present embodiment, the robot 1 learns the evaluation of the user for the behavior of the robot 1 according to the voice signal SG2 and the pressure detection signal SG3, and the learning result reflects on the behaviors to be performed hereafter.

Figure 6:
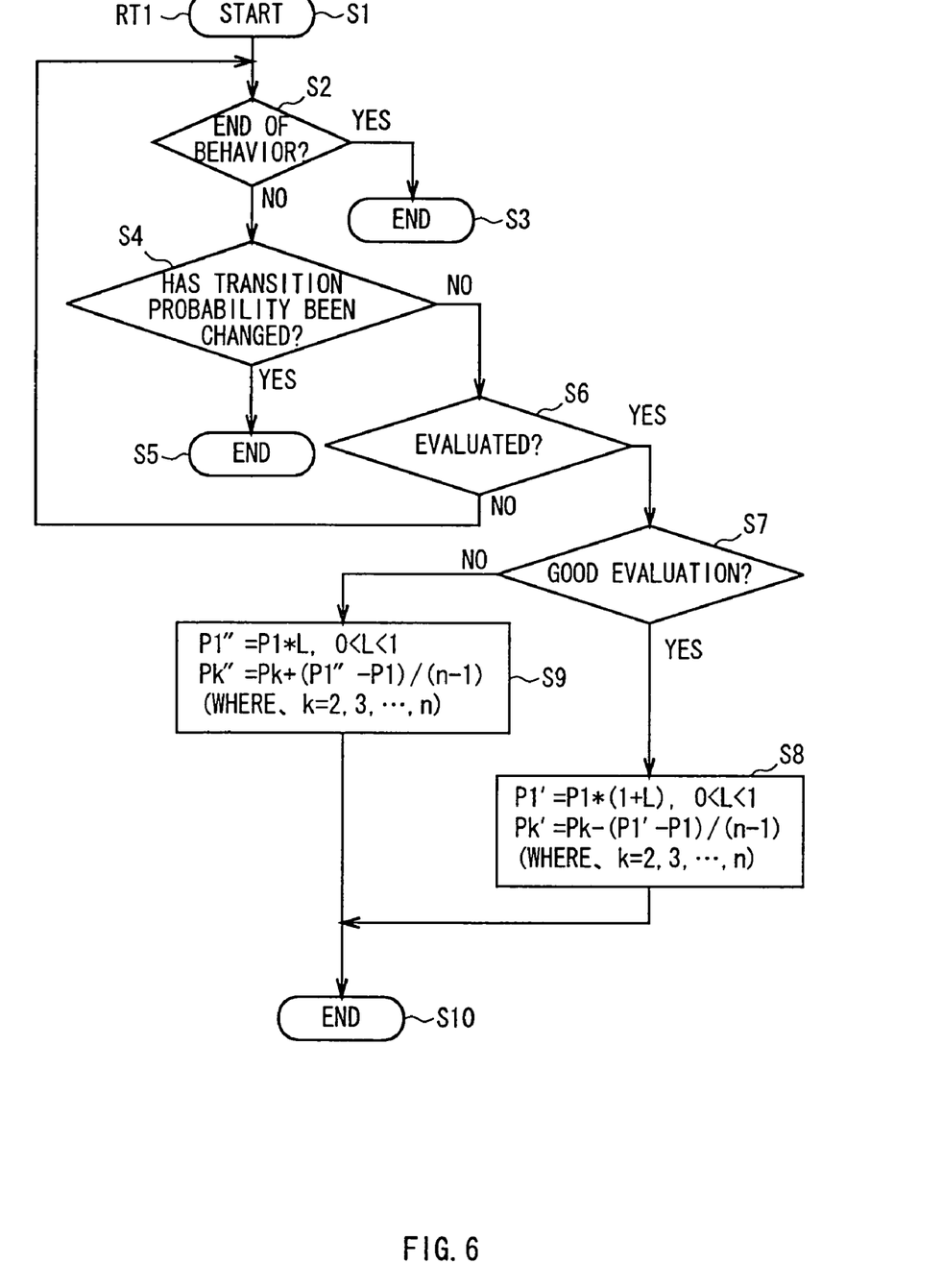
FIG. 6 is a flowchart of a transition probability changing process.

Described below by referring to the flowchart shown in FIG. 6 is the transition probability changing process for changing the transition probability P$_0$ to P$_M$ prescribing the probability automaton as a behavioral model by the CPU 20 executing the behavioral command selection evaluation program module MO$_4$.

When the robot 1 starts the transition from a preceding behavior to another behavior (transition behavior), the CPU 20 starts the transition probability changing process, and determines in step S1 whether or not the transition from the transition behavior to the next behavior has been performed.

If it is determined in step S1 that the transition from the transition behavior to the next behavior has been performed, the transition probability changing process terminates. If it is determined in step S1 that the transition from the transition behavior to the next behavior has not been performed, then control is passed to step S2, and the CPU 20 determines whether or not the CPU 20 has changed the transition probability P$_0$ to P$_M$ from the preceding behavior to each behavior.

If it is determined in step S2 that the CPU 20 has changed the transition probability $P_0$ to $P_M$ from the preceding behavior to each behavior, then the transition probability changing process terminates. If it is determined in step S2 that the CPU 20 has not changed the transition probability $P_0$ to $P_M$ from the preceding behavior to each behavior, then control is passed to step S3, and the CPU 20 determines according to the voice signal SG2 and the pressure detection signal SG3 whether or not the user has represented the evaluation such as "praise", "scolding", etc., that is, whether or not the evaluation from the user has been detected in the sensor process program module $MO_3$.

If it is determined in step S3 that the evaluation has not been represented, then control is returned to step S1, and the similar processes are repeated. If it is determined in step S3 that the evaluation has been represented, then control is passed to step S4, and the CPU 20 determines whether or not the represented evaluation of the user is "praise".

If it is determined in step S4 that the evaluation of the user is "praise", then control is passed to step S5, and the CPU 20 computes the new transition probability from a preceding behavior to another behavior by, for example, the following equation where $P_0$ indicates the original transition probability, $P_0'$ indicates the new transition probability, and L indicates the improvement ratio.

$$P_0' = P_0 \times (1+L)$$

where $0 < L < 1$

The CPU 20 also computes the new transition probability from a preceding behavior to a transition behavior by, for example, the following equation where $P_m$ indicates the original transition probability, $P_m'$ indicates the new transition probability, and M+1 indicates the total number of behaviors transferred from the preceding behavior.

$$P_m' = P_m - (P_0' - P_0)/M$$

where $m = 1, 2, \ldots, M$

The newly computed transition probability $P_0', P_1', \ldots, P_M'$ is provided for the behavior generation selection program module $MO_2$, and the transition probability of the probability automaton as a behavioral model is updated, thereby terminating the transition probability changing process.

If it is determined in step S4 that the evaluation of the user is not "praise", that is, the evaluation of the user is "scolding", then control is passed to step S6, and the CPU 20 computes the new transition probability from a preceding behavior to a transition behavior by, for example, the following equation where $P_0$ indicates the original transition probability, $P_0''$ indicates the new transition probability, and L indicates the lowering ratio.

$$P_0'' = P_0 \times L$$

where $0 < L < 1$

The CPU 20 also computes the new transition probability from a preceding behavior to a transition behavior by, for example, the following equation where $P_m$ indicates the original transition probability, $P_m^{1''}$ indicates the new transition probability, and M+1 indicates the total number of behaviors transferred from the preceding behavior.

$$P_m'' = P_m + (P_0 - P_0'')/M$$

where $m = 1, 2, \ldots, M$

The newly computed transition probability $P_0'', P_1'', \ldots, P_M''$ is provided for the behavior generation selection program module $MO_2$, and the transition probability of the probability automaton as a behavioral model is updated, thereby terminating the transition probability changing process.

In the above described transition probability changing process, if the user strokes the head of the robot 1 or says "Good!" to the robot 1 when or after the robot 1 transfers from the first behavior to the second behavior, then the evaluation of "praise" is obtained, thereby easily transferring from the first behavior to the second behavior. In addition, if the user pats the head of the robot 1 or says "Hey!" to the robot 1, the evaluation of "anger" is obtained, thereby not easily transferring from the first behavior to the second behavior.

As a result, the user uses the robot 1 for a long period while giving the robot 1 a stimulus to urge or suppress a behavior, thereby amending the transition probability of behaviors to the user desired pattern. That is, the user can experience the amusement of gradually training a pet such as a dog, a cat, etc., thereby largely improving the amusing element as a toy robot.

Figure 7:
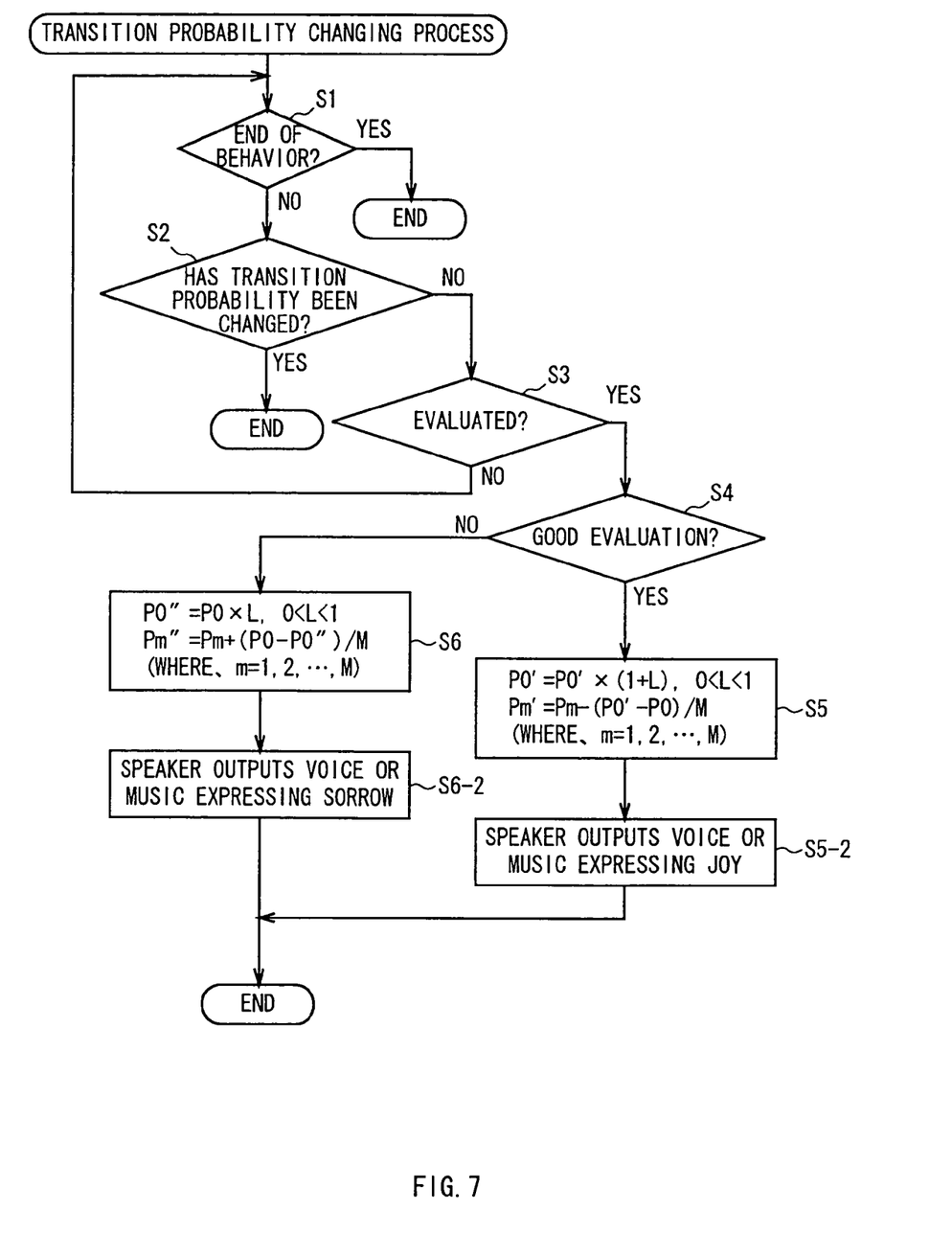
FIG. 7 is a flowchart of an example of a variation of the transition probability changing process.

As shown in FIG. 7 in which each unit is assigned the same unit number as the corresponding unit shown in FIG. 6, voice or music representing a joy is output from the speaker 13 (step S5-2) after changing the transition probability corresponding to the probability automaton as a behavioral model in step S5, or voice or music representing sorrow is output from the speaker 13 (step S6-2) after changing the transition probability corresponding to the probability automaton in step S6.

In addition to or instead of the output of the voice and music representing such a joy or sorrow, the LED 14 can be turned on in a predetermined lighting pattern indicating that the probability automaton has been changed, or it can be indicated that the probability automaton has been changed by such behaviors as wagging the tail unit 1A, depressing the tail unit 1A, etc.

In addition, in the above described case, the nonvolatile memory 23 can store the data of the spectrum waveforms of the words used for "praise" and "scolding", the sensor process module $MO_3$ determines which the spectrum waveform of the voice signal SG2 from the microphone 9 matches, the spectrum waveform of the word of "praise" or the spectrum waveform of the word of "scolding", and the evaluation of the user can be obtained based on the determination result. However, the sensor process module $MO_3$ can also recognize speech according to the voice signal SG2 from the microphone 9 in other methods to obtain the evaluation of the user based on the speech recognition result.

Figure 8:
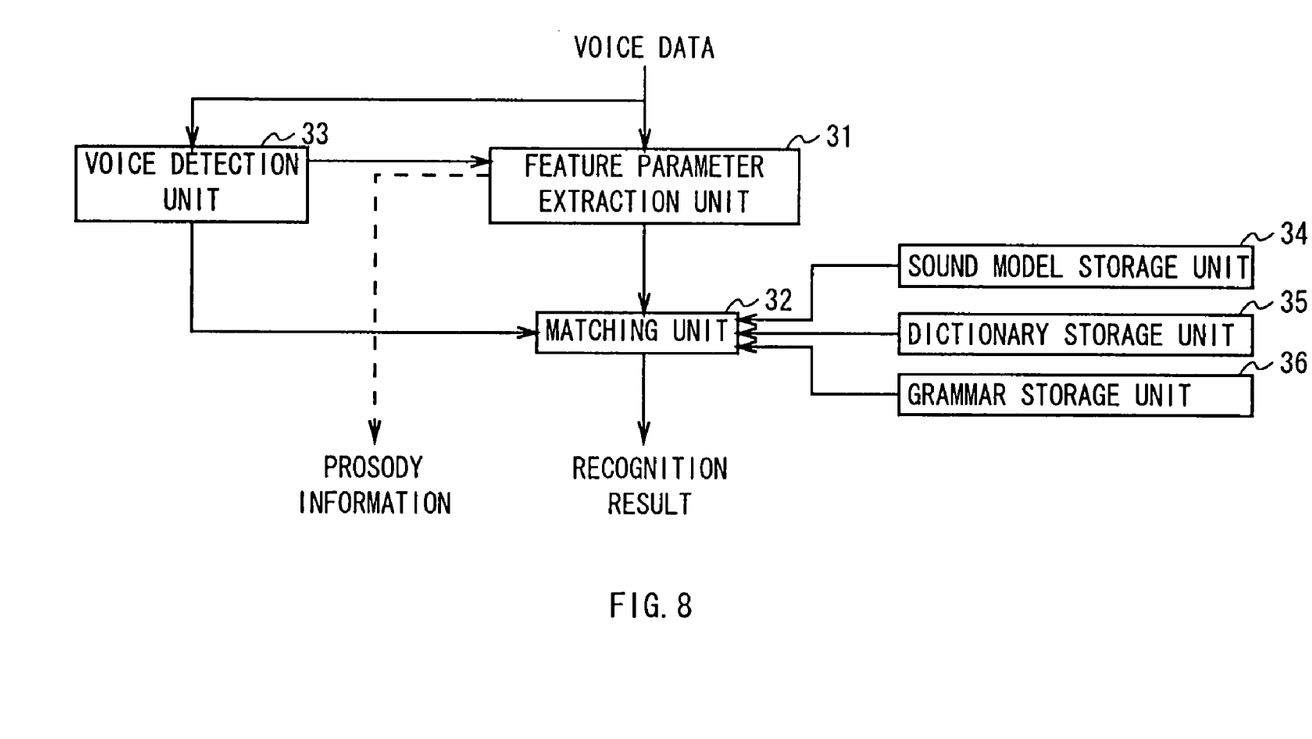
FIG. 8 is a block diagram of an example of a configuration according to an embodiment of a speech recognition device realized in function by a sensor process module MO 3.

FIG. 8 shows an example of the configuration according to an embodiment of the speech recognition device for recognizing speech in, for example, the continuous distribution HMM (Hidden Markov Model) method. The speech recognition device can be functionally realized by the CPU 20 executing the sensor process module $MO_3$.

The feature parameter extraction unit 31 can be provided with digital voice data obtained by A/D converting the voice signal SG2 from the microphone 9.

The feature parameter extraction unit 31 performs, for example, the MFCC (Mel frequency cepstrum coefficient) analysis on the voice data input to the feature parameter extraction unit 31 for each appropriate frame, and outputs the analysis result as a feature parameter (feature vector) to the matching unit 32. The feature parameter extraction unit 31 can also extract, for example, a linear prediction coefficient, a cepstrum coefficient, a linear spectrum paring, the power for a predetermined frequency band (output of a filter bank), etc. as a feature parameter.

The matching unit 32 recognizes the speech of the user input to the microphone 9 in the continuous distribution HMM method by referring to a sound model storage unit 34, a dictionary storage unit 35, and a grammar storage unit 36 as necessary using a feature parameter from the feature parameter extraction unit 31.

That is, the sound model storage unit 34 stores a sound model representing a feature in sound of voice to be recognized such as each phoneme, syllable, etc. in a language. Since speech is recognized in the continuous distribution HMM method in this example, for example, an HMM (hidden Markov model) is used as a sound model. The dictionary storage unit 35 stores a dictionary describing the information (prosody information) about the pronunciation of each word to be recognized. The grammar storage unit 36 stores the grammar rules describing how each word entered in the dictionary in the dictionary storage unit 35 is chained (connected). As grammar rules, for example, rules based on a context free grammar (CFG), a statistic word chain probability (N-gram), etc. can be used.

The matching unit 32 configures the sound model (word model) of a word by connecting a sound model stored in the sound model storage unit 34 by referring to the dictionary in the dictionary storage unit 35. Furthermore, the matching unit 32 connects some word models by referring to the grammar rules stored in the grammar storage unit 36, and recognizes the voice input to the microphone 9 in the continuous distribution HMM method based on a feature parameter using a word model connected as described above.

A word (string) as a speech recognition result obtained by the matching unit 32 is provided for the behavioral command selection evaluation module $MO_4$. In the behavioral command selection evaluation module $MO_4$, the evaluation of the user is determined, and the transition probability is changed based on the speech recognition result from a part functioning as a speech recognition device shown in FIG. 8 in the sensor process module $MO_3$.

The voice detection unit 33 is provided with voice data provided for the feature parameter extraction unit 31. The voice detection unit 33 obtains, for example, the short-time power for the provided voice data, performs a self-correlation analysis, and determines based on the short-time power and the self-correlation analysis result whether or not the voice data as the voice of a user has been input. Furthermore, the voice detection unit 33 outputs a message announcing the existence of the input of voice data as the voice of a user to the feature parameter extraction unit 31 and the matching unit 32. The feature parameter extraction unit 31 and the matching unit 32 performs a process based on the message from the voice detection unit 33 only in the period in which voice data is input as the voice of a user.

According to the embodiment shown in FIG. 8, the voice detection unit 33 is mounted to detect the existence of the input of voice data as the voice of a user. However, it is also possible to detect the input of voice data as the voice of a user in equivalence by the matching unit 32 performing a word spotting process. The word spotting process can be performed using, for example, continuous speech recognition and a garbage model. In this case, the voice detection unit 33 can be omitted.

Figure 9:
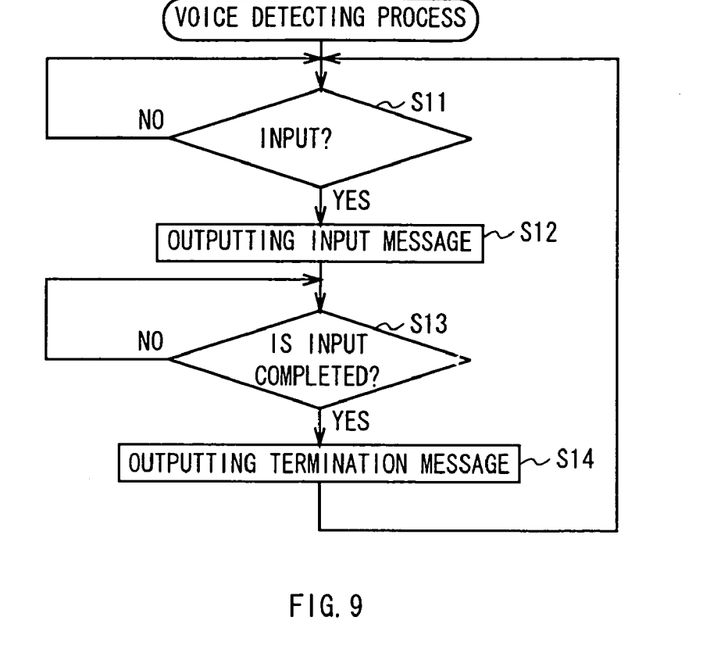
FIG. 9 is a flowchart of an operation of a voice detection unit 33.
Figure 10:
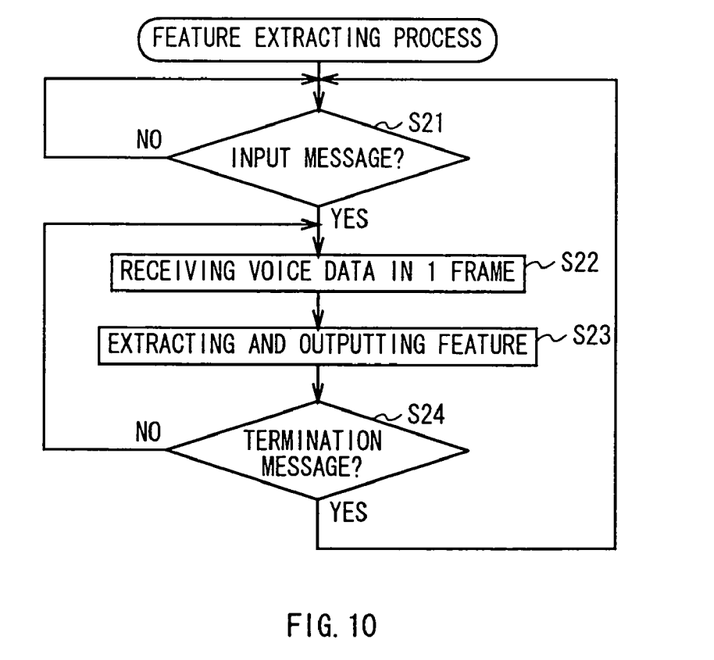
FIG. 10 is a flowchart of an operation of a feature parameter extraction unit 31.
Figure 11:
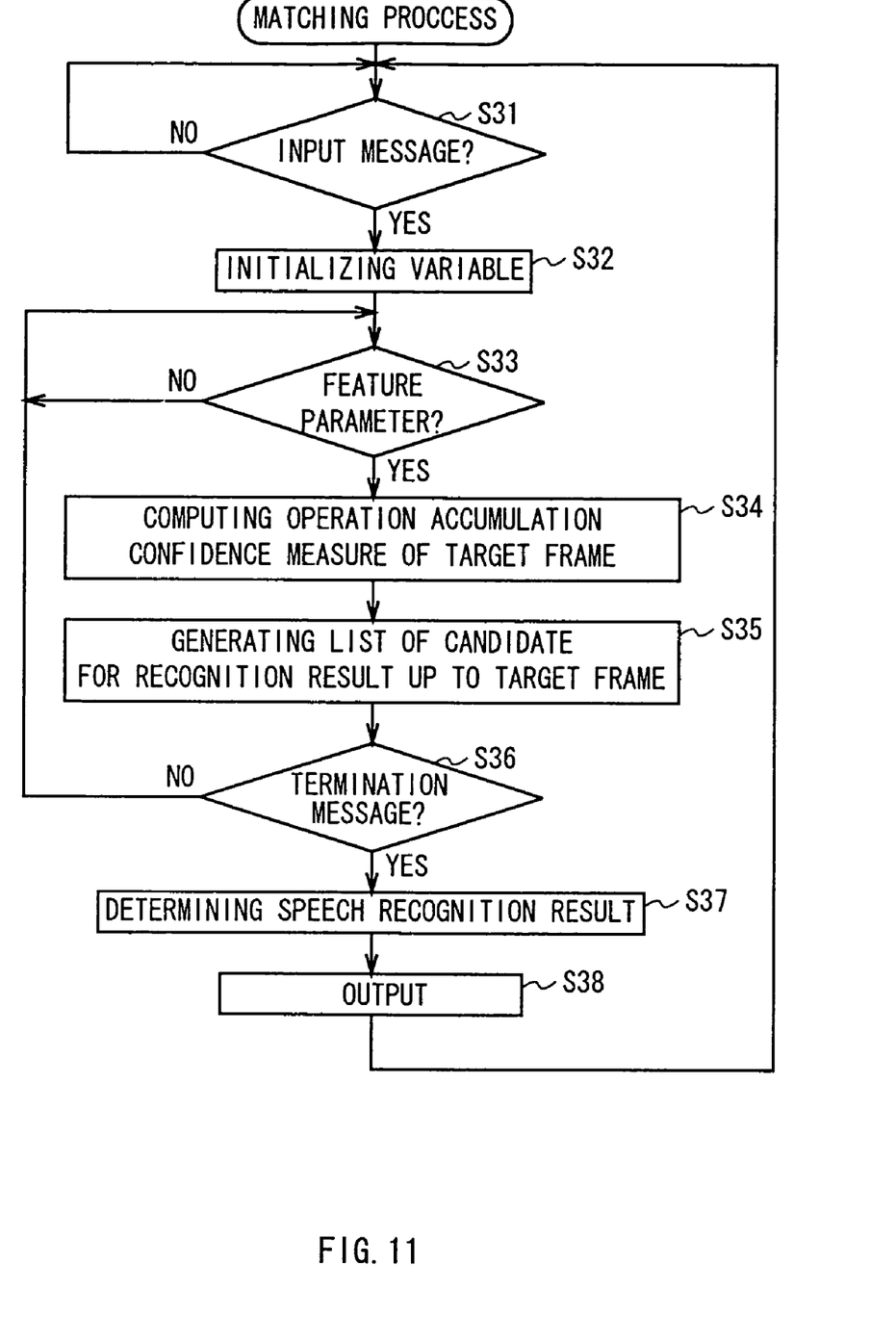
FIG. 11 is a flowchart of an operation of a matching unit 32.

Next, the operation of the speech recognition device shown in FIG. 8 is described by referring to the flowchart shown in FIGS. 9 to 11.

First, the operation of the voice detection unit 33 is described below by referring to the flowchart shown in FIG. 9.

In the voice detection unit 33, it is determined in step S11 whether or not voice data has been input as the voice of a user. That is, as described above, the voice detection unit 33 obtains, for example, the short-time power for the input to the voice detection unit 33, performs a self-correlation analysis, and determines based on the short-time power and the self-correlation analysis result whether or not the voice data as the voice of a user has been input.

If it is determined in step S11 that no voice data has been input as the voice of a user, control is returned to step S11. If it is determined in step S11 that voice data has been input as the voice of the user, control is passed to step S12, and the input message informing that the data has been input is output to the feature parameter extraction unit 31 and the matching unit 32, thereby passing control to step S13.

In step S13, it is determined whether or not voice data as the voice of a user has completely been input. The determination is made as in step S11.

If it is determined in step S13 that voice data as the voice of a user has not completely been input, that is, if voice data as the voice of a user is being input, control is returned to step S13. If it is determined in step S13 that voice data as the voice of a user has completely been input, then control is passed to step S14, and the termination message informing that the data has completely been input is output to the feature parameter extraction unit 31 and the matching unit 32. Then, control is returned to step S11, and the similar processes are repeated.

The operation of the feature parameter extraction unit 31 is described below by referring to the flowchart shown in FIG. 10.

In the feature parameter extraction unit 31, it is determined in step S21 whether or not an input message has been received from the voice detection unit 33. If it is determined that the message has not been received, control is returned to step S21.

If it is determined in step S21 that the message has been received, control is passed to step S22, and the feature parameter extraction unit 31 receives the voice data in 1 frame, thereby passing control to step S23. In step S23, the feature parameter extraction unit 21 performs the MFCC analysis on the voice data for 1 frame received in step S22, and the feature parameter obtained as an analysis result is output to the matching unit 32.

Then, control is passed to step S24, and it is determined whether or not a termination message has been received from the voice detection unit 33. If it is determined in step S24 that the termination message has not been received, control is returned to step S22, and the similar processes are repeated. If it is determined in step S24 that the termination message has been received, then control is returned to step S21, and the similar processes are repeated.

Then, the operation of the matching unit 32 is described below by referring to the flowchart shown in FIG. 11.

In the matching unit 32, it is determined in step S31 whether or not an input message has been received from the voice detection unit 33. If it is determined that the message has not been received, control is returned to step S31.

If it is determined in step S31 that the message has been received, control is passed to step S32, and the matching unit 32 initializes a variable (for example, a variable for storage of an accumulation value of score of the HMM described later) for use in various operations, and control is passed to step S33. In step S33, it is determined whether or not a feature parameter in 1 frame has been received from the feature parameter extraction unit 31. If it is determined that the parameter has not been received, then control is returned to step S33.

If it is determined in step S33 that a feature parameter in 1 frame has been received, then control is passed to step S34, and the matching unit 32 defines the frame of the feature parameter as a target frame, and performs an operation on the score of the HMM about the target frame using the received feature parameter, adds the result to the accumulation value of the score of the HMM obtained after receiving the input image, and obtains a new accumulation value. Furthermore, the matching unit 32 computes a confidence measure using the feature parameter of the target frame, and control is passed to step S35. In the voice detection unit 33, a range from the output of an input message to the output of a termination message is referred to as a voice range. However, in the voice detection unit 33, not a voice range, but a noise-only range in which a user does not enter a communications mode can be mistakenly detected. Therefore, in this example, the confidence measure is computed, and the noise-only range mistakenly detected as a voice range can be deleted based on the confidence measure.

A confidence measure can be computed based on the probability of a continuation time length by obtaining the probability of the continuation time length based on the distribution of the continuation time length of speech. The confidence measure can be a measure with the feature amount of voice other than the continuation time length taken into account.

In step S35, a list of words which can be candidates for a speech recognition result is generated based on the accumulation value of the score of the HMM up to the target frame, and control is passed to step S36. In step S36, it is determined whether or not a termination message has been received from the voice detection unit 33. If it is determined in step S36 that a termination message has not been received, then control is returned to step S33, and the similar processes are repeated.

If it is determined in step S36 that a termination message has been received, control is passed to step S37, and the word having the highest score is extracted as the final speech recognition result from the list, generated in step S35, of words which can be candidates for a speech recognition result, thereby passing control to step S38.

In step S38, the speech recognition result is provided for the behavioral command selection evaluation module $MO_4$, and control is returned to step S31, thereby repeating the similar processes.

As described above, the behavioral command selection evaluation module $MO_4$ receives the speech recognition result output by the matching unit 32, determines the evaluation of the user based on the speech recognition result, and, based on the evaluation, changes the transition probability of the probability automaton (FIG. 5) as a behavioral model as described by referring to steps S5 and S6 shown in FIG. 6.

Figure 12:
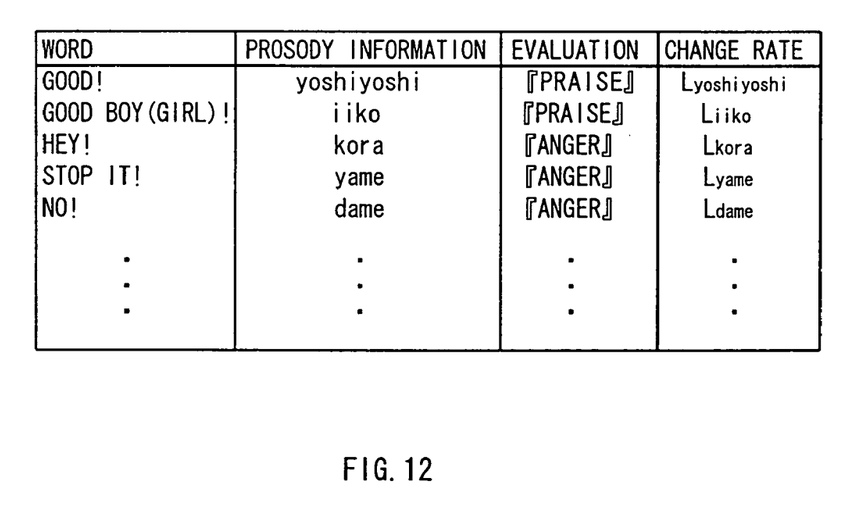
FIG. 12 shows a dictionary.

In the dictionary stored in the dictionary storage unit 35 of the speech recognition device shown in FIG. 8, the evaluation of a speaker when a word is given, and the rate of changing the transition probability when the word is given can be registered as corresponding to each word in addition to the prosody information about each word to be recognized as shown in FIG. 12. In this case, the rate of changing the transition probability can be different for each word as a speech recognition result. Even if the speech of a user is evaluated as, for example, "anger" (or "praise"), the change rate of the transition probability can be different for each of the given words.

That is, both "Better stop." and "Stop!" belong to the evaluation of "anger". However, when "Stop!" is given, as compared with "Better stop.", the change rate of the transition probability can be higher.

In the dictionary shown in FIG. 12, it is possible to associate each word with the change rate of the transition probability, an equation for changing the transition probability, and other methods of changing the transition probability.

In the case above, the transition probability is changed based on each word (string) as a speech recognition result. Furthermore, for example, as indicated by the dotted line shown in FIG. 8, the feature parameter extraction unit 31 can obtain and output the prosody information such as the intonation, pitch, voice range of each phoneme, etc. of the speech of a user. Based on the prosody information, the change rate of the transition probability can be amended.

As described above, the evaluation of a user can be recognized according to the voice signal SG2 output from the microphone 9 and the pressure detection signal SG3 output from the pressure sensor 10, and the transition probability of a behavior is changed based on the recognition result. Therefore, the transition probability of a behavior prescribing a behavioral model (probability automaton in the present embodiment) can be changed according to the liking of a user, thereby realizing a robot having an improved amusing element. In addition, depending on the physical stimulus detected by the pressure sensor 10, the evaluation of either "praise" or "scolding" represented respectively by "stroke" or "slap" can be obtained. Based on the evaluation, the transition probability can be changed at a predetermined rate. When a stimulus is given by the speech of a user, the robot can obtain from the speech recognition result, etc. the level of the user's "praise" or "anger" in addition to the evaluation of "praise" or "anger". Therefore, the transition probability can be changed stepwise at a rate based on the level of the user's "praise" or "anger".

According to the above described embodiment, the present invention is applied to the robot 1 for entertainment. However, the present invention is not limited to this application, but can be widely applied to various mechanical devices.

In addition, according to the above described embodiment, the motors $7_1$ to $7_N$ are used as drive means for allowing the robot 1 to perform behaviors. However, the present invention is not limited to this, but other mechanical devices such as an actuator, a speaker, a buzzer, a lighting device, etc. can be used as drive means as long as the mechanical devices can represent a behavior (action) represented to other objects.

Furthermore, according to the above described embodiment, the present invention is applied to change the transition pattern of the behaviors of the robot 1. However, the present invention is not limited to this application, but can change the transition pattern of the operations for a higher concept.

Furthermore, according to the above described embodiment, voice and pressure is used as a stimulus for changing the transition probability $P_0$ to $P_M$ of the behavior of the robot 1 in the probability automaton. However, the present invention is not limited to this application, but the robot 1 can be designed to recognize the expressions and behaviors of a user by processing an image, and change the transition probability $P_0$ to $P_M$ of a behavior based on the recognition result. That is, various other stimuli can be used as long as the behavioral model (the probability automaton according to an embodiment of the present invention) prescribing a behavior can be changed based on a predetermined stimulus from outside.

In addition, according to the above described embodiment, the microphone 9 and the pressure sensor 10 are used as stimulus detection means for detecting a stimulus. However, the present invention is not limited to these means, but various other types of stimulus detection means can be used as long as the means can detect a predetermined stimulus.

Furthermore, according to the above described embodiment, semiconductor memory (program memory 21) is applied as storage means for storing a behavioral model prescribing a behavior. However, the present invention is not limited to this memory, but other storage means such as disk or tape storage media, etc. can be used.

Additionally, according to the above described embodiment, the CPU 20 for controlling the behavior of the entire robot 1 is used as control means for controlling the motors $7_1$ to $7_N$ based on the behavioral command selection module $MO_2$ (probability automaton) stored in the program memory 21. However, the present invention is not limited to this means, but a CPU as control means can be mounted separately.

Furthermore, according to the above described embodiment, a probability automaton is used as a behavioral model. However, the present invention is not limited to this application, but various other automatons such as an automaton in which a weight coefficient assigned to an arc is other than the transition probability can be used. In addition to the automaton, algorithms such as a neural network, the IF-Then rule, etc. can be applied.

According to the above described embodiment, corresponding transition probability in the probability automaton as a behavioral model can be changed only when voice of a predetermined pattern is detected or when pressure of a predetermined size and length is detected. However, the present invention is not limited to this application, but a changed transition probability in the probability automaton can be gradually or immediately restored to the original value when a predetermined time passes depending on the time lapse after the CPU changes corresponding transition probability in the probability automaton. Thus, the robot can be furthermore improved in an amusement element of an entertainment robot.

Furthermore, in the initial state of the behavioral model (probability automaton) of the robot 1, the transition probability to a node corresponding to a behavior can be set to, for example, 0. In this case, the transition probability of 0 can be increased by receiving a stimulus. As a result, by receiving stimuli, the robot 1 can perform a behavior which cannot be performed in the initial state, thereby improving the amusing element as an entertainment robot.

Additionally, according to the embodiment, a series of processes described above can be performed by the CPU 20 executing the program. The series of processes can also be performed by the exclusive hardware.

A program can be stored in the program memory 21, and can also be stored (recorded) temporarily or permanently in a removable recording medium such as a floppy disk, CD-ROM (compact disk read only memory), an MO (magneto-optical) disk, a DVD (digital versatile disk), a magnetic disk, a semiconductor memory, etc. The above described removable recording medium can be provided as package software, and installed on the robot 1 (program memory 21).

In addition, a program can be installed to the program memory 21 not only through a removable recording medium, but also by radio through a satellite for digital satellite broadcast from the download side, and by wire through a network such as a LAN (local area network), Internet, etc.

In this case, when a program is updated, the updated program can be easily installed on the program memory 21.

In the specification of the present invention, the process step describing the program for directing the CPU 20 to perform various processes is not always performed in a time series in the order of description, but contains a process (for example, a process in a parallel process or an object process) to be performed individually or in parallel.

Furthermore, a program can be performed by a CPU or can be performed in a distributing process by a plurality of CPUs.

Additionally, the transition probability can be changed by an algorithm other than the algorithm corresponding to the above described equations.

INDUSTRIAL APPLICABILITY

The present invention can be applied to an entertainment robot.

What is claimed is:

1. A mechanical device, characterized by comprising:
   drive means for performing a behavior;
   stimulus detection means for detecting a stimulus;
   storage means for storing a behavioral model prescribing a behavior;
   control means for controlling said drive means based on the behavioral model stored in said storage means; and
   changing means for changing the behavioral model based on a predetermined stimulus detected by said stimulus detection means; wherein said behavioral model is a probability automaton prescribed by a state corresponding to a behavior and a transition probability of the state; said changing means changes the transition probability P in the probability automaton by calculating a new transition probability P" according to the following transition probability equations; wherein the transition probability is multiplied by an improvement ratio $L_1$ if the stimulus detected by said stimulus detection means is evaluated as being good $$P''=P\times(1+L_1) \text{ (where } 0<L_1<1)$$

and by a lowering ratio $L_2$ if the stimulus is evaluated as not being good $$P''=P\times L_2 \text{ (where } 0<L_2<1).$$

2. The mechanical device according to claim 1, characterized in that said stimulus is provided by a user.

3. The mechanical device according to claim 2, characterized in that:
   said stimulus detection means comprises a pressure sensor detecting pressure provided by the user as the stimulus; and
   said changing means changes the behavioral model based on the pressure detected by said pressure sensor.

4. The mechanical device according to claim 2, characterized in that:
   said stimulus detection means comprises a pressure sensor detecting pressure provided by the user as the stimulus; and
   said changing means changes the behavioral model based on the pressure detected by said pressure sensor.

5. The mechanical device according to claim 2, characterized in that:
said stimulus detection means comprises a microphone collecting voice provided by the user as the stimulus; and
said changing means changes the behavioral model based on the voice collected by said microphone.

6. The mechanical device according to claim 5, characterized in that:
said stimulus detection means further comprises a speech recognition means for recognizing the voice; and
said changing means changes the behavioral model based on speech recognition result of the voice collected by said speech recognition means.

7. The mechanical device according to claim 6, characterized in that:
said speech recognition means comprises a dictionary storing a word to be voice-recognized corresponding to a method for changing the behavioral model, and outputting any of words stored in said dictionary as the speech recognition result; and
said changing means changes the behavioral model according to the method for changing the behavioral model corresponding to the word as the speech recognition result.

8. The mechanical device according to claim 5, characterized in that:
said stimulus detection means further comprises a prosody information detection means detecting prosody information about the voice; and
said changing means changes the behavioral model according to the prosody information detected by said prosody information detection means.

9. The mechanical device according to claim 1, characterized in that said changing means restores the behavioral model to an original state depending on a time lapse after changing the behavioral model.

10. A method for driving a mechanical device, comprising:
a controlling step of controlling drive means for allowing said mechanical device to perform a behavior based on a behavioral model prescribing a behavior;
a stimulus detecting step of detecting a stimulus; and
a changing step of changing the behavioral model based on a predetermined stimulus detected in said stimulus detecting step; wherein said behavioral model is a probability automaton prescribed by a state corresponding to a behavior and a transition probability of the state; said changing step changes the transition probability P in the probability automaton by calculating a new transition probability P" according to the following transition probability equations; wherein the transition probability is multiplied by an improvement ratio $L_1$ if the stimulus detected in said stimulus detection step is evaluated as being good:

$$P''=P \times (1+L_1) \text{ (where } 0<L_1<1)$$

and by a lowering ratio $L_2$ if the stimulus is evaluated as not being good:

$$P''=P \times L_2 \text{ (where } 0<L_2<1).$$

11. A recording medium, where a program by which a computer drives a mechanical device is recorded, characterized in that the program comprises:
a controlling step of controlling drive means for allowing said mechanical device to perform a behavior based on a behavioral model prescribing a behavior;
a stimulus detecting step of detecting a stimulus; and
a changing step of changing the behavioral model based on a predetermined stimulus detected in said stimulus detecting step; wherein said behavioral model is a probability automaton prescribed by a state corresponding to a behavior and a transition probability of the state; said changing step changes the transition probability P in the probability automaton by calculating a new transition probability P" according to the following transition probability equations wherein the transition probability is multiplied by an improvement ratio $L_1$ if the stimulus detected in said stimulus detection step is evaluated as being good:

$$P''=P \times (1+L_1) \text{ (where } 0<L_1<1)$$

and by a lowering ratio $L_2$ if the stimulus is evaluated as not being good:

$$P''=P \times L_2 \text{ (where } 0<L_2<1).$$

* * * * *